Nov. 8, 1960 W. H. DECKER 2,959,346
COMBUSTION CALCULATOR

Filed Jan. 3, 1956 4 Sheets-Sheet 1

INVENTOR.
William H. Decker
BY
Adams, Forward & McLean
ATTORNEYS

Nov. 8, 1960

W. H. DECKER 2,959,346

COMBUSTION CALCULATOR

Filed Jan. 3, 1956

INVENTOR.
William H. Decker

BY Adams, Forward & McLean

ATTORNEYS

Nov. 8, 1960 W. H. DECKER 2,959,346
COMBUSTION CALCULATOR
Filed Jan. 3, 1956 4 Sheets-Sheet 3

INVENTOR.
William H. Decker
BY
Adams, Forward & McLean
ATTORNEYS

United States Patent Office 2,959,346
Patented Nov. 8, 1960

2,959,346

COMBUSTION CALCULATOR

William H. Decker, Hazel Crest, Ill., assignor to Sinclair Refining Company, New York, N.Y., a corporation of Maine Filed Jan. 3, 1956, Ser. No. 556,996

1 Claim. (Cl. 235—61)

My invention relates to calculations concerning furnace operation and in particular provides a convenient computor for determining combustion efficiency of fuel burning equipment and the changes necessary to bring the equipment to maximum efficiency, based only on knowledge of stack temperature, of flue gas analysis (Orsat) and of the general type of fuel employed, all of which data are readily obtainable in the field without involved procedure.

The study of combustion problems in the field has always been complicated by the inability of the field personnel quickly and accurately to analyze the operation of the fuel burning equipment under study. Such an analysis, to be of much value, must include among other items, a knowledge of the combustion efficiency (100 percent stack loss) of the equipment. The reason for this is that, if the combustion efficiency is an unknown, then it is not possible to ascertain readily the changes required to bring the unit to maximum efficiency (minimum stack loss). It is to this end that all combustion survey studies eventually must point to be of any value. Perhaps the most important factor involved in the combustion of fuels is to minimize fuel consumption so as to maintain the lowest operating costs.

The determination of combustion efficiency is based on the following primary factors:

(a) Flue gas analysis.
(b) Flue gas exit temperature.
(c) Type of fuel burned.
(d) Analysis of fuel burned.
(e) Heating value of fuel burned.

There are, in addition, a number of factors of secondary importance which influence, to a minor degree, the accuracy of combustion efficiency calculations. These are:

(f) Inlet air temperature.
(g) Inlet air relative humidity.
(h) Inlet fuel temperature.
(i) Fuel impurities—sulfur, nitrogen, water, etc.

For extremely accurate calculations the latter group of factors must be given consideration; however, for practically all field calcuations they can safely be considered as having no effect.

Therefore, it is necessary to have a knowledge of the data involved in the first five items above. The analysis of the flue gas can be determined by conventional Orsat equipment. The flue gas temperature can be determined by means of a suitable temperature measuring instrument, e.g., thermocouple, thermometer, etc. The type of fuel being burned is known, i.e., liquid, gaseous, or a mixture of the two. Neither the analysis nor the heating value of the fuel, however, is normally readily available. Consequently, an arbitrarily assumed gross heating value must be used to determine the combustion efficiency.

With these data available, it is possible to determine the efficiency either by reference to numerous published charts and tables or by detailed stoichiometric calculations. Each of these methods is unwieldy and time-consuming and not particularly suitable for field use. Where such methods are based upon an assumed fuel analysis and heating value, a variable error of unknown magnitude can be introduced. In the case of units burning mixtures of liquid and gaseous fuels, the final results may often be seriously in error.

It is in order, therefore, to consider in more detail the problem of fuel analysis and gross heating values. The chemical analysis of a fuel, either liquid or gaseous, to determine the amount of carbon, hydrogen, sulfur, and other constituents present, requires an extensive amount of equipment together with trained technicians skilled in the use of this equipment. The same is true for the determination of the calorific value of the fuel, i.e., heating value. In addition, there is a considerable time factor involved. Because of these factors, absolute fuel analyses are not usually available in field work and accurate combustion calculation cannot be made available at the site of a furnace without long delay and resort to laboratory work.

It is an object of my invention to provide suitable means of overcoming these objections and permit reasonably correct fuel analysis and heating value data to be obtained without resort to laboratory analysis.

It is another object of my invention to provide a computor capable of estimating fuel analysis and heating value based on the readily available data limited to items (a), (b) and (c) above in such a form that the estimation can be made by a simple mechanical operation.

It is a further object of my invention to provide a computor for performing such estimations and the calculation therefrom of the changes necessary to bring a fuel burning unit to maximum efficiency utilizing slide rule scales of the recti-linear, cylindrical or circular types. Since the various basic slide rule constructions are well known and the conversion from one mechanical form to another is a routine matter, I will hereinafter, for illustrative purposes only, describe my invention with reference to the recti-linear slide type construction which represents a preferred form of my invention.

In order to accomplish these and other purposes, I have devised a slide rule construction by which the available data from Orsat flue gas analysis, i.e., volume percent $O_2$, $CO_2$ and $N_2$ (by difference) are converted to an estimation of percentage excess air, theoretical percentage of $CO_2$ and the carbon-hydrogen weight ratio of the fuel employed. Utilizing the thusly determining carbon-hydrogen ratio and knowledge of the stack temperature, minimum flue gas loss is then determined. This information together with the previously determined percentage excess air then permits calculation of the flue gas loss due to the excess air. By a specially constructed scale the gross heating value of the fuel can be read directly based on the knowledge only of carbon-hydrogen ratio previously determined. Finally, with knowledge of the gross heating value, the previously determined minimum flue gas loss and flue gas loss due to excess air are utilized to ascertain the percent flue gas loss, i.e., combustion efficiency of the furnace under consideration.

For a more complete understanding of the slide rule construction of my invention reference is made to the appended drawings in which.

Figure 1:
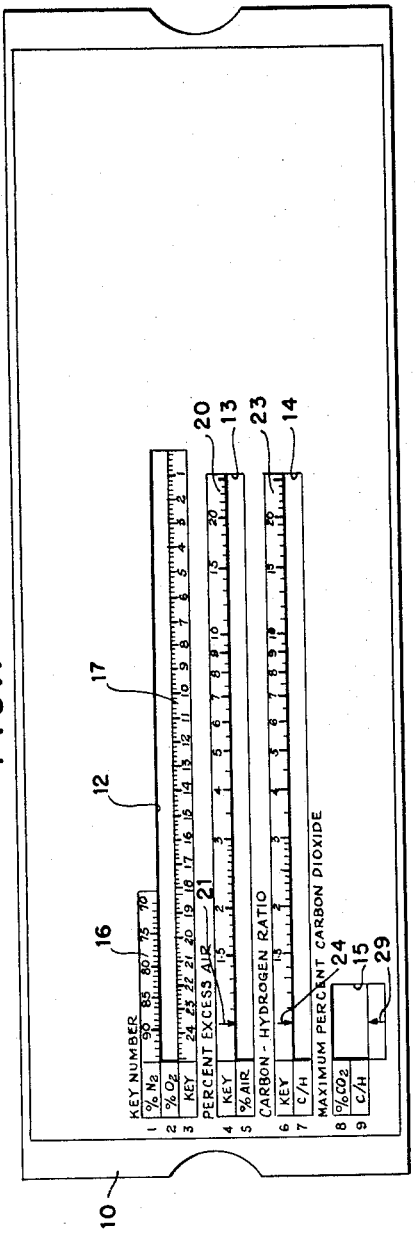
Figure 1 is a plan view of the front face of the slide rule of my invention with the slide removed.
Figure 2:
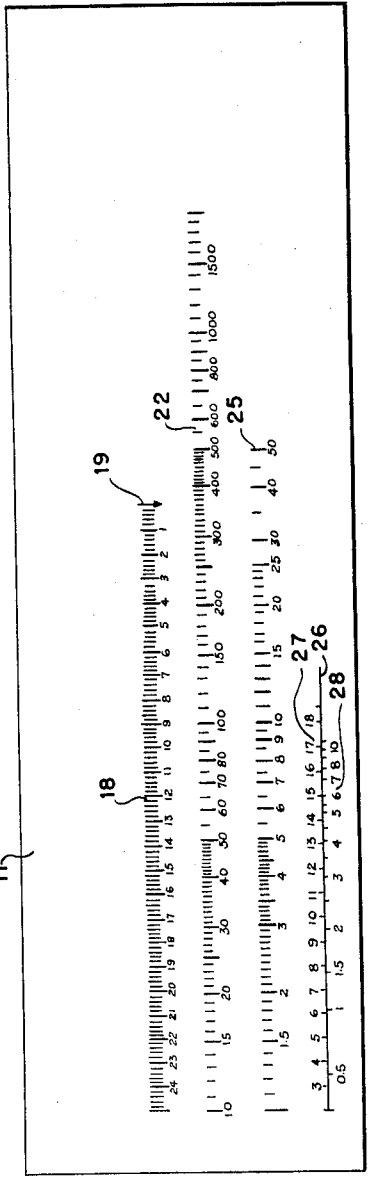
Figure 2 is a plan view of the front face of the slide which bears scales cooperating with scales of the front face of the rule shown in Figure 1.
Figures 3, 4:
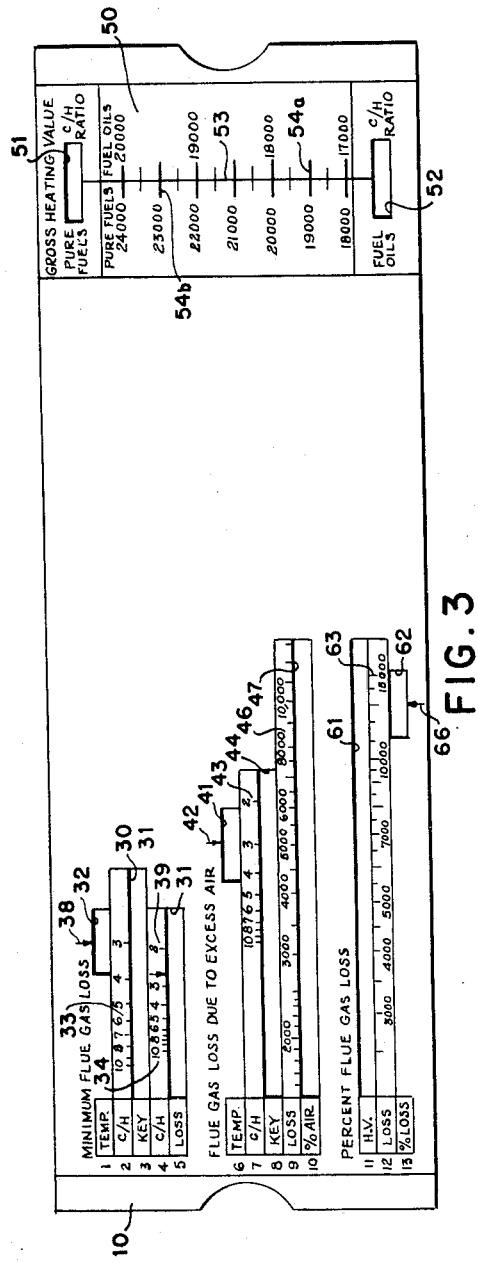
Figure 3 is a plan view of the rear face of the slide rule shown in Figure 1, also with the slide removed.
Figure 4 is a plan view of the rear face of the slide shown in Figure 2 which face bears scales cooperating with scales on the rear face of the rule shown in Figure 3.
Figure 6:
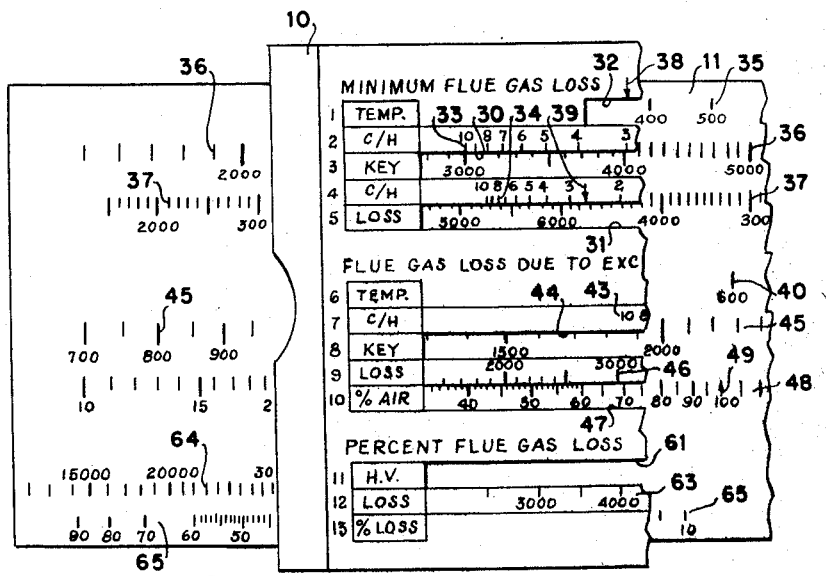
Figure 6 is a fragmentary plan view of the rear face of the slide rule showing cooperation between scales on the rear face of the slide rule.
Figure 5:
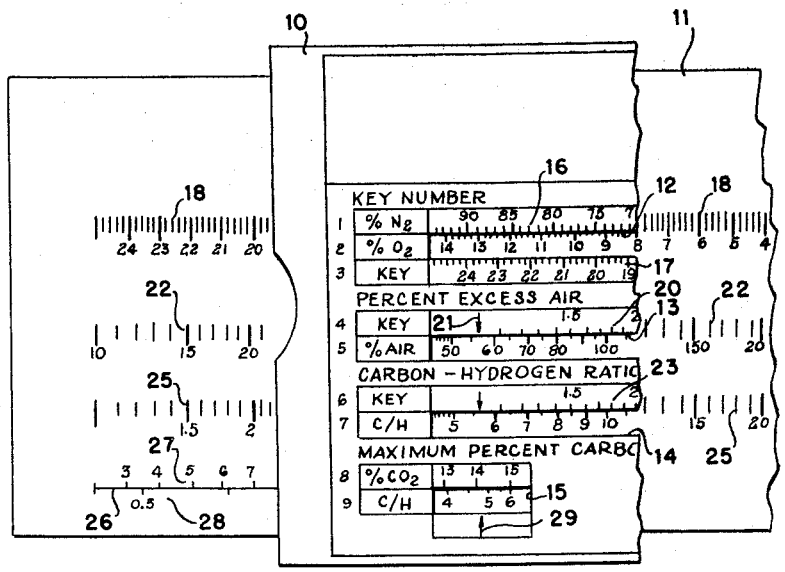
Figure 5 is a fragmentary plan view of the front face of the rule showing cooperation between the scales on the front face of the slide rule.
Figure 7:
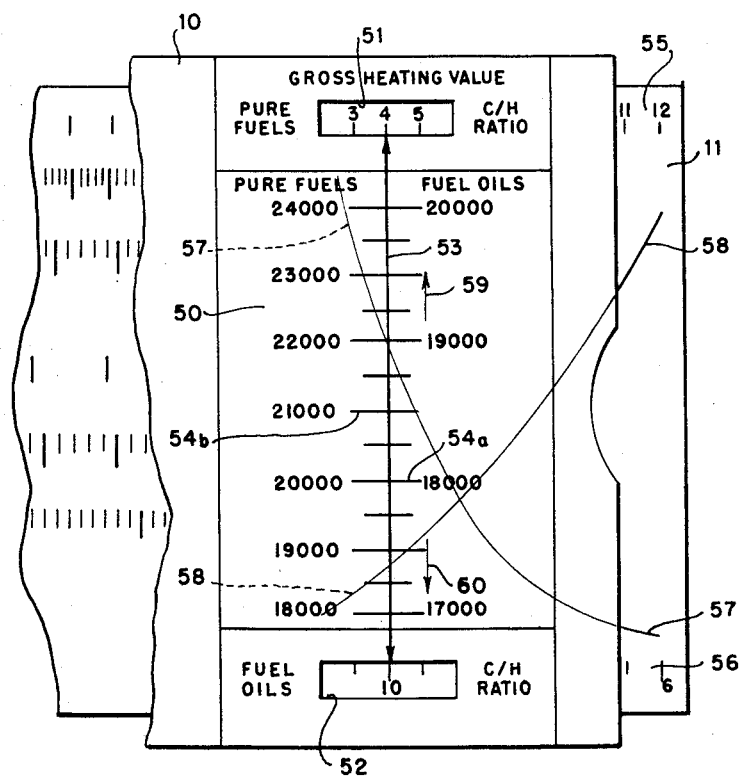
Figure 7 is a fragmentary plan view of another portion of the rear face of the slide rule showing cooperation between a different set of scales on the rear face of the slide rule.

Referring more particularly to Figures 1 and 3, the slide rule of my invention includes a flattened sleeve 10 constructed of opaque material adapted to receive slidingly and endwise a flat slide 11, also constructed of opaque material and shown in Figures 2 and 4. Figures 5, 6 and 7 illustrate the cooperation between sleeve 10 and slide 11.

Referring again to Figure 1, sleeve 10 is provided on its front face with three rectangular elongated windows 12, 13 and 14 which extend parallel to each other and endwise of sleeve 10. A fourth, short, rectangular window 15 is positioned near the bottom of the left end of the front face of sleeve 10 as seen in Figure 1.

Inscribed lengthwise on sleeve 10 adjacent to the upper edge of window 12 is a linear scale 16 calibrated in percent nitrogen and decreasing in value from left to right. Inscribed lengthwise on sleeve 10 adjacent to the lower edge of window 12 is a second linear scale 17 decreasing in value from left to right and having an origin aligned transversely of sleeve 10 with the origin of scale 16, if extended.

Each calibrated unit of scale 17 is equal in value to 2.64 units on scale 16. Cooperating with scale 16 is a scale 18 (see Figure 2) which is inscribed lengthwise of slide 11 and which appears in window 12 as seen most clearly in Figure 5. Scale 18 is calibrated in terms of percent oxygen decreasing in value from left to right and each calibrated unit has a value equal to 2.64 units on scale 16. At its origin scale 18 is provided with an indexing arrow 19 which cooperates with scale 17.

Inscribed lengthwise on sleeve 10 adjacent the upper edge of window 13 is a logarithmic scale 20 increasing in value from left to right and having an arrow index 21 at the value 1 which cooperates with scale 22 inscribed lengthwise on slide 11 as appears more clearly in Figure 5. Scale 22, also a logarithmic scale with the same modulus as scale 20, is calibrated in terms of percent excess air increasing in value from left to right whereas scale 20 is calibrated in the same terms as scale 17.

Scales 16, 17, 18, 20 and 22 are utilized to perform the calculation of percent excess air from a knowledge of percent oxygen and percent nitrogen based on the formula $$\% \text{ excess air} = \%O_2/0.264 \ (\% \ N_2) - \%O_2 \quad (1)$$

Inscribed lengthwise on sleeve 10 adjacent to the upper edge of window 14 is a logarithmic scale 23 calibrated identically and aligned transversely of sleeve 10 with scale 20 and having an indexing arrow 24 at the value 1 for cooperation with scale 25 inscribed lengthwise on slide 11. Scale 25, also a logarithmic scale with the same modulus as scale 23, is calibrated in terms of the carbon-hydrogen ratio increasing in value from left to right and appears in window 14 as shown in Figure 5. Scales 23 and 25 are used in conjunction with scales 16, 17 and 18 to determine the carbon-hydrogen ratio of a fuel employed from a knowledge of the percent carbon dioxide, percent nitrogen and percent oxygen as follows:

Lbs. of carbon in fuel $= \%$ $CO_2$ in flue gas $\times$ mole wt.
$= \% \ CO_2 \times 12$ Total moles of $O_2$ supplied $= \% \ N_2 \times 0.209/0.791 = 0.264 \% \ N_2$ $O_2$ required to burn carbon $= \% \ CO_2$ Moles of $O_2$ not used $= \% \ O_2$ Moles of $O_2$ used to burn hydrogen in the fuel $= (0.264\% \ N_2) - (\% \ CO_2 + \% \ O_2)$ Moles of hydrogen burned $= 2(0.264\% \ N_2) - (\% \ CO_2 + \% \ O_2)$ Lbs. of $H_2$ in fuel $= 4(0.264\% \ N_2) - (\% \ CO_2 + \% \ O_2)$ Carbon-hydrogen ratio
$$= \frac{\% \ CO_2 \times 12}{4(0.264\% \ N_2) - (\% \ CO_2 + \% \ O_2)}$$
$$= \frac{3\% \ CO_2}{0.264\% \ N_2 - (\% \ CO_2 + \% \ O_2)} \quad (2)$$

where $\% \ O_2$, $\% \ CO_2$, and $\% \ N_2$ refer to the flue gas analysis.

It will be noted that Formula 2 has been derived so that the denominator contains the same term ($0.264\% \ N_2$) as does Formula 1 for the percent excess air. This has been done so that common scales can be used for both determinations, which results in a simplification of the slide rule and its application.

Inscribed lengthwise near the left end of the bottom of the front face of slide 11 is a line 26 which is provided along its upper edge with a linear scale 27 and along its lower edge with a logarithmic scale 28. Scale 27 is calibrated in terms of percent carbon dioxide increasing in value from left to right, while scale 28 is calibrated in terms of carbon-hydrogen ratio also increasing in value from left to right. Both scales appear in window 15 on the front face of sleeve 10, as shown more clearly in Figure 5, and cooperate with an arrow index 29 marked on sleeve 10 adjacent to the lower edge of window 15. The relationship between scales 27 and 28 is fixed and is based upon an approximation of maximum percent carbon dioxide read on scale 27 with carbon to hydrogen ratio previously determined and read on scale 25. This approximation is developed as follows:

$C=$ weight fraction of carbon in fuel
$H=$ weight fraction of hydrogen in fuel
$X=$ carbon-hydrogen ratio (weight ratio)
$Q=$ moles of $CO_2$ in flue gas
$P=$ moles of $H_2O$ in flue gas then, neglecting sulphur, nitrogen and other impurities in the fuel:

$$C+H=1.0$$
$$X=C/H$$
$$H=C/X$$
$$Q=C/12$$
$$C=12Q$$

therefore
$$C+C/X=1.0$$
$$(CX+C)/X=1$$
$$(CX+C)=X$$

and
$$(12QX+12Q)=X$$
$$12Q(X+1)=X$$
$$Q=\frac{X}{12(X+1)}=\text{moles of } CO_2 \quad (3)$$

Formula 3 gives the moles of $CO_2$ produced from any fuel. A similar relationship can be developed for the moles of hydrogen produced from any fuel:

Since $$C+H=1.0$$
$$C=HX$$
$$P=H/2$$
$$H=2P$$
$$HX+H=1.0$$
$$2PX+2P=1.0$$
$$2P(X+1)=1.0$$

$$P=\frac{1}{2(X+1)}=\text{moles of } H_2 \quad (4)$$

With these two relationships, a formula for the theoretical air required can be developed:

Oxygen required to burn carbon to carbon dioxide $$\text{Moles } O_2 \text{ req'd.} = \frac{X}{12(X+1)}$$

Oxygen required to burn hydrogen to water $$\text{Moles } O_2 \text{ req'd.} = \frac{1}{4(X+1)}$$

$$\text{Total oxygen req'd.} = \frac{X}{12(X+1)} + \frac{1}{4(X+1)}$$

Since oxygen represents 20.9% by volume in air $$\text{Total air req'd.} = \left(\frac{1}{.209}\right)\left(\frac{X+3}{12(X+1)}\right)$$
$$= 0.400\left(\frac{X+3}{X+1}\right) \quad (5)$$

Therefore, by combining (3), (4) and (5) a relationship can be developed to show the maximum percent carbon dioxide for any given fuel, which occurs when all oxygen is consumed by the fuel and all the fuel is consumed. Theoretical maximum percent carbon dioxide is thus equal to 100 times the quotient the moles of carbon dioxide produced by burning the fuel (Q) and the sum of Q and the moles of nitrogen in the theoretical air.

Thus:

$$\text{Theoretical \% } CO_2 = \frac{Q}{Q+\text{moles of } N_2} \cdot 100$$

$$\text{Moles of } N_2 = 0.791 \text{ theoretical air}$$
$$= (0.791)(0.400)\frac{X+3}{X+4}$$
$$= \frac{0.791(X+3)}{(0.29)(12)(X+1)}$$

$$\text{Moles of } CO_2(Q) = \frac{X}{12(X+1)}$$

Therefore:

$$\text{Theoretical \% } CO_2 = \frac{\frac{X}{12(X+1)}}{\frac{X}{12(X+11)}+\frac{0.791(X+3)}{(0.209)(12)(X+1)}} \cdot 100$$

$$= \frac{X}{X+\frac{0.791(X+3)}{0.209(X+1)}} \cdot 100$$

$$= \frac{100X}{4.78X+11.34} \quad (6)$$

Equation 6 constitutes the relationship between scales 27 and 28 on slide 11. Thus, for example, the numeral 1 on the carbon-hydrogen weight ratio scale is aligned with the value 6.16 on scale 27, and so forth.

The reverse face of the slide rule is shown in Figures 3, 4, 6 and 7. Sleeve 10 is provided with five elongated rectangular window portions extending lengthwise of sleeve 10 and parallel to each other. These are associated in three groups together with three additional short rectangular windows and several scales.

Elongated window 30, elongated window 31 and short window 32 in sleeve 10 are associated with scales 33 and 34 inscribed lengthwise on the reverse face of sleeve 10 and with scales 35, 36 and 37 inscribed lengthwise on the reverse face of slide 11 for the determination of minimum flue gas loss based upon knowledge solely of stack temperature and carbon-hydrogen ratio as determined by use of the scales on the front face of the slide rule. In the use of these scales the flue gas loss is determined by a heat balance based upon the combustion of one pound of fuel with the theoretical quantity of air, employing an assumed datum temperature of 60° F. These calculations are as follows:

Let $M$ = minimum flue gas loss, B.t.u./lb.
$T$ = flue gas temperature, °F.
$MC_p$ = mean specific heat, B.t.u./lb. mole °F.
$H$ = heat content, B.t.u./lb. mole Then the total flue gas loss is made up as follows:

$CO_2$: Moles of $CO_2 \times$ heat content above 60° F.
$H_2O$: Moles of $H_2O \times$ heat content above 212° F. (sensible)
    Moles of $H_2O \times$ heat content (60° F.–212° F. plus latent heat)
$N_2$: Moles of $N_2 \times$ heat content above 60° F.

The specific heat of a gas at any temperature (T) is calculated from the generalized relationship with $a$, $b$, and $c$, as constants.

$$C_p = a + bT + CT^2$$

This is the instantaneous specific heat, and the mean specific heat over the temperature range in question is determined by integrating this equation:

$T_1$ = lower temperature (60° F.)
$T_2$ = higher temperature

Then $$MC_p = \int_{T_1}^{T_2}(a+bT+CT^2)dT/T_2-T_1$$

and $$MC_p = a + \frac{b}{2}(T_2+T_1) + \frac{C}{3}(T_2^2+T_2T_1+T_1^2)$$

Therefore, the heat content above $T_1$ (60° F.) for any gas is as follows:

$$H = (T_2-T_1)\left[a+\frac{b}{2}(T_1+T_2)+\frac{C}{3}(T_1^2+T_1T_2+T_2^2)\right]$$

The constants for this equation in calories per gram mole per °K. are:

|  | a | b | c |
|---|---|---|---|
| $CO_2$ | 7.70 | 0.0053 | −0.000,00083 |
| $N_2$ | 6.76 | 0.000606 | +0.000,00013 |
| $H_2O$ | 8.22 | 0.00015 | +0.000,000134 |

Substituting for $T_1$ a base temperature of 60° F. and converting to B.t.u. per lb. mole per °F. the equation takes the general form:

$$H = a_1T + b_1T^2 + c_1T^3 - d_1$$

where $a_1$, $b_1$, $c_1$, and $d_1$ are new constants.

The final equations then become:

$$H_{CO_2} = 7.67T + 0.001472T^2$$
$$-0.000,00002539T^3 - 4389 \quad (7)$$

$$H_{N_2} = 6.76T + 0.000168T^2$$
$$+0.000,0000134T^3 - 3563 \quad (8)$$

$$H_{H_2O} = 8.22T + 0.0000415T^2$$
$$+0.000,000138T^3 - 5584 \quad (9)$$

All of these equations except (9) will give the heat content above 60° F. Equation 9 gives the heat content above 212° F. since allowance must be made for the latent heat of vaporization of the water plus the sensible heat from 60° F.–212° F. This is done as follows:

$$H_{60-212} = 18(212-60) + 970.3$$
$$= 20200 \text{ B.t.u./lb. mole} \quad (10)$$

The corrected equation for the total heat content of water then becomes:

$$H_{H_2O} = 8.22T + 0.0000415T^2 + 0.000,000138T^3 + 14616 \quad (11)$$

The heat content equation for nitrogen will also be used for the heat content of both oxygen and air. This is a simplification since the mean specific heats of oxygen and air are slightly different from the specific heat of nitrogen. This simplification, however, will have little material effect on the finally calculated stack loss.

With these equations the stack loss can readily be calculated from the following equations:

For a given carbon-hydrogen weight ratio:

$$H_{CO_2} = \frac{X}{12(X+1)}[7.67T + 0.0001472T^2 - 0.000,0008539T^2 - 4389] \quad (12)$$

$$H_{N_2} = \frac{3.78(X+3)}{12(X+1)}[6.76T + 0.000168T^2 + 0.000,0000134T^3 - 3563] \quad (13)$$

$$H_{H_2O} = \frac{1}{2(X+1)}[8.22T + 0.0000415T^2 + 0.000,000138T^3 + 14600] \quad (14)$$

Combining and simplifying, the final expression of minimum stack loss becomes:

$$10.50T[1.0 + 0.0000171T + 0.00000000777T^2]/(X+1)$$
$$+ 2.77TX[1.0 + 0.0000635T$$
$$- 0.00000000105T^2]/(X+1) + [3940 - 1485X]/(X+1) \quad (15)$$

This formula can be further simplified:

Let
$$A = 1.0 + 0.0000171T + 0.00000000777T^2$$
and
$$B = 1.0 + 0.0000635T + 0.00000000105T^2$$
Then
Minimum stack loss:

$$= (10.50TA + 2.77TB)/(X+1) + (3940 - 1485X)/(X+1) \quad (16)$$

In applying these calculations to the slide rule, scale 35 on slide 10 is a logarithmic scale increasing in value from left to right calibrated in ° F. and is fixed in position with respect to logarithmic scale 36 on slide 11. Scale 33 on sleeve 10 adjacent the upper edge of window 30 also is a logarithmic scale but decreases in value from left to right and is calibrated in terms of carbon-hydrogen ratio, X. Scale 36 represents an intermediate product such that by indexing the stack temperature, T, on scale 35 opposite index arrow 38 adjacent the upper edge of window 32, in which scale 35 appears (see Figure 5) the quotient $(10.50TA + 2.77TB)/(X+1)$ will appear in window 30 on scale 36 opposite the numeral on scale 33 corresponding to the previously determined carbon-hydrogen ratio. The value so read on scale 36 for the particular stack temperature and carbon-hydrogen ratio is then transferred to scale 37. Scale 37 is linear, increasing in value from left to right, and is calibrated in terms of flue gas loss. The value derived from scale 36 is aligned on scale 37 opposite indexing arrow 39 located adjacent the upper edge of window 31 in which scale 37 appears.

Scale 34, which is located adjacent the upper edge of window 31 and which cooperates with scale 37, is a logarithmic scale which, like scale 33, is calibrated in terms of carbon-hydrogen ratio. Minimum flue gas loss is read on scale 37 opposite the value on scale 34 corresponding to the carbon-hydrogen ratio for the fuel.

The second group of associated scales on the reverse side of the scale includes logarithmic scale 40 inscribed lengthwise on slide 11 and positioned to appear in window 41 in sleeve 10. Scale 40, increasing in value from left to right, is calibrated in terms of stack temperature. An indexing arrow 42, inscribed adjacent the upper edge of window 41, is employed for aligning scale 40 at the observed stack temperature. A scale 43 inscribed lengthwise on sleeve 10 is located adjacent the upper edge of window 44 and cooperates with scale 45 inscribed lengthwise on slide 11 which appears in window 44. Scale 43 is a logarithmic scale, as also is scale 45. Scale 43 is calibrated in terms of carbon-hydrogen ratio of the fuel decreasing in value from left to right. Scale 45 is calibrated in terms of an intermediate product, increasing in value from left to right, involving the variables stack temperature and carbon-hydrogen ratio, such that by aligning stack temperature on scale 40 in window 41 opposite indexing arrow 42, the proper intermediate product is read on scale 45 opposite the carbon-hydrogen ratio on scale 43. Scale 46 is marked lengthwise on the face of sleeve 10 adjacent the upper edge of window 47 in which appears scale 48 inscribed lengthwise on slide 11. Both scales 46 and 48 are logarithmic and increase in value from left to right, the former being calibrated in terms of flue gas loss and the latter being calibrated in terms of percent excess air. An indexing arrow 49 for cooperating with scale 46 is marked on sleeve 10 at the value 100 percent on scale 48.

Scales 40, 43, 45, 46 and 48 are employed in determining flue gas loss due to the employment of excess air based upon a knowledge only of the carbon-hydrogen ratio, excess air and stack temperature, assuming, as can be done with negligible error, that the gases present have a mean specific heat identical to that of nitrogen. This relationship is derived as follows:

Let $E$ = fraction of excess air
$H_{N_2}$ = heat content above 60° F., B.t.u. lb. mole (see Equation 8)
$T$ = stack gas temperature, ° F.
$X$ = fuel carbon-hydrogen ratio Therefore $$\text{Stack loss} = 0.4\left(\frac{X+3}{X+1}\right)E[6.76T + 0.00168T^2 + 0.0000000134T^3 - 3653]$$

This can be simplified:

$$\text{Stack loss} = \left(\frac{X+3}{X+1}\right)E[2.71T + 0.000067T^2 + 0.00000000536T^3 - 1425] \quad (17)$$

In adapting Equation 17 to the slide rule, it will be observed that the variable (T) is introduced on stack temperature scale 40, the variable carbon-hydrogen ratio (X) is introduced on scale 43 to derive an intermediate product on scale 45. Transferring this intermediate product to scale 48, the variable, percent air above theoretical, i.e., percent excess air, is introduced on scale 49 to read the stack loss due to excess air on scale 46. It will be observed that in the preceding operations stack loss has been calculated in two parts, one yielding the theoretical minimum stack loss that is possible and the second calculating the percent stack loss caused by the presence of excess air. The sum of these two losses read on scales 37 and 46, respectively, is obviously total stack loss.

The slide rule could, of course, be modified to include scales providing this additive function, if desired.

The final calculation necessary to determine combustion efficiency is the calculation of percent flue gas loss, in effect a reflection of the efficiency of the furnace under consideration. In order to calculate percent flue gas loss it is essential to have a knowledge of the gross heating value of the fuel employed. The gross heating values of pure fuels consisting solely of hydrocarbons can be calculated simply from a knowledge of their carbon-hydrogen ratio based upon the presently available knowledge of the combustion reactions. I have found that, moreover, carbon-hydrogen ratio bears a general relation to the gross heating value for straight run and cracked fuel oils and that there is very little departure having negligible effect in the calculations under consideration, from one fuel oil to the other in this relationship of carbon-hydrogen ratio to gross heating value. This conclusion was reached after investigating the results of seventy experimental determinations and comparing them with an additional seventeen experimental determinations reported in Petroleum Refinery Engineering, W. L. Nelson (McGraw-Hill Book Company, Inc., 1949), 3rd edition at page 360 in Table 77. These data were plotted on a curve employing rectilinear coordinates to relate carbon-hydrogen ratio to the gross heating value in B.t.u. per pound. This curve is essentially a smooth line drawn through the following points:

| Carbon-hydrogen ratio: | B.t.u. |
|---|---|
| 5.1 | 20,800 |
| 5.5 | 20,450 |
| 6.0 | 20,040 |
| 7.0 | 19,250 |
| 8.0 | 18,600 |
| 9.0 | 18,000 |
| 10.0 | 17,450 |

These data and the theoretical data for pure fuels, such as butane, are introduced on the slide rule shown in the drawings by providing on sleeve 10 a transparent rectangular portion 50 located near the right end of the reverse face of sleeve 10. Adjacent the upper edge of the reverse face of sleeve 10 in the opaque area along that edge adjacent to transparent area 50, a window 51 is provided. Similarly, adjacent the lower edge toward the right end of the reverse face of sleeve 10 in the opaque area beneath transparent area 50, there is located a second window 52.

A transverse line 53 extending between windows 51 and 52 across area 50 is inscribed on the reverse face of sleeve 10. In the transparent portion 50, line 53 is provided with markings indicating two scales, 54a and 54b. Scale 54a is located along the right side of line 53 as seen in Fig. 3, is linear, increasing in value from bottom to top, and is calibrated in terms of gross heating value of fuel oils. Scale 54b, lying to the left of line 53, as seen in Fig. 3, is also a linear scale increasing in value from bottom to top, but is calibrated in terms of gross heating value of pure fuels.

Inscribed lengthwise on the reverse face of slide 11 in the upper right hand corner thereof, as seen in Fig. 4, is a linear scale 55, increasing in value from left to right, calibrated in terms of carbon-hydrogen ratio and appearing (see Fig. 7) in window 51 in sleeve 10 to cooperate with the upper end of line 53. A similar linear scale 56, decreasing in value from left to right, is inscribed in the lower right hand corner on the reverse face of slide 11 as seen in Fig. 4. Scale 56 is also calibrated in terms of carbon-hydrogen ratio and appears in window 52 of sleeve 10 to cooperate with the lower end of line 53.

Between scales 55 and 56 at the right end of the reverse face of slide 11, as seen in Fig. 4, there are inscribed two curves, 57 and 58. Curve 57 is provided with an arrow legend 59 indicating toward scale 55, while curve 58 is provided with an arrow legend 60 indicating toward scale 56. Both curves 57 and 58 (see Fig. 7) appear through the transparent portion 50 of sleeve 10 and cooperate by intersection with line 53.

The proportioning of curve 57 is based upon the theoretical gross heating values of pure fuels. Thus, if the particular furnace under consideration is employing a pure fuel its gross heating value is ascertained by moving slide 11 so that the previously determined carbon-hydrogen ratio appears on scale 55 in window 51 at the upper end of line 53. The intersection of curve 57 with line 53 then indicates the proper gross heating value on scale 54b.

The proportioning of curve 58 is based upon the above-mentioned relationship of carbon-hydrogen ratio and the gross heating values of fuel oils. Thus, if the fuel under consideration is a fuel oil, its gross heating value is ascertained by adjusting slide 11 so that its previously determined carbon-hydrogen ratio appears on scale 56 in window 52 at the lower end of line 53. The intersection of curve 58 with line 53 then indicates on scale 54a the approximate gross heating value of the fuel oil.

The third group of associated group of lengthwise scales and windows on the reverse side of the slide rule includes elongated window 61 and short window 62. In this group are also logarithmic scale 63 inscribed lengthwise on the reverse side of sleeve 10 adjacent the lower edge of window 61. Scale 63 increases in value from left to right and is calibrated in terms of total flue gas loss in B.t.u. per pound. Inscribed on the reverse face of slide 11 is a logarithmic scale 64 appearing in window 61 (see Fig. 6) and a logarithmic scale 65 appearing in window 62. Scale 64 increases in value from left to right and is calibrated in terms of gross heating value in b.t.u. per pound. Scale 65 decreases in value from left to right and is calibrated in terms of percent loss. An indexing arrow 66 is inscribed on sleeve 10 adjacent the lower edge of window 62. These scales cooperate to indicate percent flue gas loss according to the following expression:

$$\text{Percent stack loss} = \frac{\text{total stack loss, B.t.u./lb.} \times 100}{\text{gross heating value, B.t.u./lb.}}$$

(18)

It is thus apparent that the gross heating value determined from scale 54a or 54b is indexed on scale 64 opposite the total stack loss determined by adding the minimum flue gas loss ascertained on scale 37 and the flue gas loss due to excess air ascertained on scale 46. Scale 65 is positioned so that the quotient of these two variables times 100 (the right hand expression in Equation 18) appears on scale 65 in window 62 opposite arrow 66.

*Example*

A furnace employing a commercial fuel oil is investigated by ascertaining its stack temperature and Orsat analysis as follows:

| | |
|---|---|
| Stack temperature | ° F__ 1000 |
| Volume $O_2$ | percent__ 8.2 |
| Volume $CO_2$ | do____ 9.3 |
| Volume $N_2$ (diff.) | do____ 82.5 |

The percentage of excess air is first calculated by setting the number 8.2, the percent oxygen, on scale 18 under 82.5, the percent nitrogen, on scale 16. Intermediate product 13.7 then appears on scale 17 opposite index 19. Slide 11 is then adjusted so that 100% $O_2$ read on scale 22 appears opposite the intermediate product 13.7 on scale 20. Then there appears under the index 21 on scale 22 the number 60.0 which is the percent excess air employed in the furnace. The carbon-hydrogen ratio of the fuel oil employed is then ascertained by setting the total percentage of carbon dioxide and oxygen, 17.5, on scale 18 beneath 82.5, the percentage nitrogen, on scale 16. The resulting intermediate product 4.5 appearing on scale 17 opposite index 19 is then aligned on scale 23 opposite 27.9, three times the percentage carbon dioxide on scale 25. The index 24 then indicates 6.45, the carbon-hydrogen ratio of the fuel on scale 25.

Maximum percent carbon dioxide is read directly on scale 27 opposite 6.45 the carbon-hydrogen ratio on scale 28. Indexing arrow 29 assists in aligning the scale for clear reading.

The minimum flue gas loss is determined by setting 1000° F., the stack temperature, on scale 35 opposite indicating arrow 38. An intermediate product 5320 then appears on scale 36 opposite 6.45 the carbon-hydrogen ratio on scale 33. This intermediate product 5320 is then set on scale 37 opposite index 39 and the minimum loss in B.t.u.'s per pound, 5150, is read on scale 37 opposite 6.45 the carbon-hydrogen ratio on scale 34. This represents the theoretical minimum flue gas loss which could occur.

The excess flue gas loss over this minimum is ascertained by positioning 1000° F., the stack temperature, on scale 40 under index 42. An intermediate product 3450 is then read on scale 45 under 6.45 the carbon-hydrogen ratio on scale 43. This intermediate product 3450 is set on scale 46 opposite index 49 and the B.t.u. per pound loss 2090 is read on scale 46 opposite 60.0, the percent excess air on scale 48.

Slide 11 is then adjusted to ascertain the gross heating value of the fuel oil by moving slide 11 so that the carbon-hydrogen ratio on scale 56 cooperates with the lower end of line 53. The intersection of curve 58 with line 53 thus indicates on scale 54a that the gross heating value of the fuel oil is 19,750 B.t.u. per pound. This knowledge of the flue gas losses and of the gross heating value of the fuel is then finally utilized to determine the combustion efficiency in the furnace by aligning 7240 B.t.u. per pound, the sum of the flue gas losses, on scale 63 with 19,750 B.t.u. per pound, the gross heating value of the fuel oil, on scale 64. The percentage loss, 36.5%, then appears on scale 65 opposite arrow 66.

I claim:

In a combustion efficiency computer, the combination comprising a pair of relatively movable members, one of said members being a slide and the other of said members being a sleeve receiving said slide; a scale on said one of said members extending in the direction of relative movement of said members and calibrated in carbon-hydrogen ratio of fuel oils; a line on the other of said members extending transversely to the direction of relative movement of said members, calibrated in gross heating value of fuel oils and cooperating at one end with said scale on said one member; a curve on said one member cooperating with said line for use with said scale and said line for determining gross heating value of fuel oils for any selected carbon-hydrogen ratio; a transparent portion on said other member across which said line transversely extends overlying said curve of said one member; an opaque portion on said other member adjacent said transparent portion, said line extending onto said opaque portion and terminating thereon; and a window in said opaque portion on said other member at the terminal end of said line thereon and overlying said scale on said one member whereby said terminal end of said line cooperates with and indexes said scale.

References Cited in the file of this patent

UNITED STATES PATENTS 2,761,619     Veron et al. _____ Sept. 4, 1956

FOREIGN PATENTS 500,663     France _____ Jan. 2, 1920
753,426     France _____ Aug. 7, 1933

OTHER REFERENCES

"Special Slide Rules" by J. N. Arnold, Purdue University, Lafayette, Ind., 1933, pages 28 and 29.